United States Patent [19]

Seitz et al.

[11] Patent Number: 5,252,666
[45] Date of Patent: Oct. 12, 1993

[54] PARTICULATE GRAFT POLYMER WITH IMPROVED ADHESION BETWEEN GRAFTING BASE AND GRAFT SHEATH

[75] Inventors: Friedrich Seitz, Friedelsheim; Karl Ruppmich, Ludwigshafen; Josef Schwaab, Maikammer, all of Fed. Rep. of Germany

[73] Assignee: BASF Aktiengesellschaft, Ludwigshafen, Fed. Rep. of Germany

[21] Appl. No.: 663,171

[22] Filed: Mar. 1, 1991

[30] Foreign Application Priority Data

Mar. 3, 1990 [DE] Fed. Rep. of Germany ....... 4006643

[51] Int. Cl.⁵ .................... C08L 51/04; C08F 265/04; C08F 265/06
[52] U.S. Cl. ......................... 525/80; 525/85; 525/303; 525/306; 525/308; 524/504
[58] Field of Search ............... 525/303, 306, 308, 80, 525/85; 524/504

[56] References Cited

U.S. PATENT DOCUMENTS

| | | | |
|---|---|---|---|
| 3,055,859 | 9/1962 | Vollmert | 525/227 |
| 3,793,282 | 2/1974 | Fock et al. | 525/296 |
| 3,879,494 | 4/1975 | Milkovich et al. | 525/74 |
| 4,707,513 | 11/1987 | Baer | 525/303 |
| 4,764,563 | 8/1988 | Meredith et al. | 525/316 |

FOREIGN PATENT DOCUMENTS 231933 8/1987 European Pat. Off.
1260135 11/1968 Fed. Rep. of Germany.

*Primary Examiner*—Vasu S. Jagannathan
*Attorney, Agent, or Firm*—Oblon, Spivak, McClelland, Maier & Neustadt

[57] ABSTRACT

A particulate graft polymer comprises from 30 to 90% by weight, of at least one elastomeric polymer A having a median particle size of from. 30 to 1000 nm comprising—based on A—from 85 to 99.8% by weight of at least one alkyl acrylate A1 having from 1 to 8 carbon atoms in the alkyl moiety, from 0.1 to 5% by weight of at least one polyfunctional, crosslinking monomer A2 and from 0.1 to 10% by weight of at least one further monoethylenically unsaturated monomer as grafting base, and from 10 to 70% by weight, grafted onto the elastomeric polymer A, of a sheath B comprising—based on B—from 50 to 90% by weight of at least one aromatic vinyl monomer B1 and from 10 to 50% by weight of at least one polar, copolymerizable, ethylenically unsaturated monomer B2, wherein monomer A3 is a hydroxyalkyl acrylate or methacrylate.

4 Claims, No Drawings

PARTICULATE GRAFT POLYMER WITH IMPROVED ADHESION BETWEEN GRAFTING BASE AND GRAFT SHEATH

The present invention relates to particulate graft polymers and to thermoplastic molding materials prepared therefrom.

The preparation of particulate graft polymers having an elastomeric core, ie. a polymer having a glass transition temperature of below 0° C., and a graft sheath by, for example, emulsion polymerization is known. First a grafting base is prepared by emulsion polymerization of suitable monomers whose polymers have a glass transition temperature of below 0° C. The monomers which are to form the graft sheath are then polymerized in the presence of the grafting base in such a way as to graft a very high proportion of them onto the grafting base. The particulate graft polymers are used for improving the impact toughness of intrinsically brittle, impact-sensitive thermoplastics. It is customary for the monomers selected for the graft sheath to be compatible with the thermoplastics to be modified. The preparation of such impact toughness modifiers has been known for a long time and is described for example in U.S. Pat. No. 30 55 859 and DE 12 60 135.

A main problem with the preparation of such particulate graft polymers is the attachment of the graft sheath to the grafting base. If the attachment is poor, the impact-modifying effect is not sufficient, so that only products of reduced toughness can be obtained. A number of measures have been proposed to improve the attachment, of which the use of graft-linking or graft-enhancing monomers in the preparation of the grafting base is just one (eg. U.S. Pat. No. 4 764 563, EP 231 933).

DE-A-22 12 928, which describes thermosettable acrylic ester resins which may also contain styrene or acrylonitrile and which contain hydroxyalkyl acrylates as part of the curable system, does not yield any information which might lead to solving the problem, inter alia because thermoplastic molding materials, to which the present invention relates, must not be heat-curable.

According to a definition given in said EP 231 933, graft-linking or enhancing monomers differ from cross-linking monomers in that graft-linking/enhancing monomers contain 2-or more polymerizable double bonds which differ greatly in their reactivity in respect of the polymerization, while the double bonds of cross-linking monomers show virtually the same reactivity. However, it is known that such a sharp distinction is not possible in general because in some instances even the less reactive double bonds of the graft-linking/enhancing monomers take part in the preparation of the grafting base and hence lead to an increased degree of crosslinking of the grafting base. They are consequently no longer available for graft reactions. On the other hand, the proportion of graft-linking/enhancing monomers in the grafting base cannot be increased ad infinitum since their crosslinking effect leads to embrittlement of the elastomeric polymer used as grafting base.

We have now found that the degree of attachment of the graft sheath to the grafting base can be considerably improved by using as the grafting base A a polymer which in addition to customary monomers, namely from 85 to 99.8 % by weight of alkyl acrylate A1 having from 1 to 8 carbon atoms in the alkyl moiety and from 0.1 to 5 % by weight of polyfunctional, crosslinking monomer A2, also contains from 0.1 to 10 % by weight of a hydroxyalkyl acrylate or methacryldte A3 as copolymerized units. The percentages are based on an imaginary grafting base A.

The present invention accordingly provides particulate graft polymers comprising from 30 to 90, preferably from 55 to 90, particularly preferably from 60 to 90, % by weight, based on the sum total of A and B, of at least one elastomeric polymer A having a median particle size of from 30 to 1000 nm comprising—based on A from—85 to 99.8% by weight of at least one alkyl acrylate A1 having from 1 to 8 carbon atoms in the alkyl moiety, from 0.1 to 5% by weight of at least one polyfunctional crosslinking monomer A2 and from 0.1 to 10% by weight of at least one further monoethylenically unsaturated monomer, as grafting base and from 10 to 70, preferably from 10 to 45, particularly preferably from 10 to 40, % by weight, based on the sum total of A and B, of a sheath B, grafted onto the elastomeric polymer A and comprising—based on B—from 50 to 90, preferably from 60 to 90, particularly preferably from 65 to 80, % by weight, of at least one aromatic vinyl monomer B1—preferably styrene—from 10 to 50, preferably from 10 to 40, particularly preferably from 20 to 35,, % by weight, of at least one polar, copolymerizable, ethylenically, unsaturated monomer B2—preferably acrylonitrile—which contain as monomer A3 a hydroxyalkyl acrylate or methacrylate. The weight ratio between monomers B1 and B2 should be within the range from 80:20 to 60:40, in particular from 80:20 to 65:35.

The present invention thus concerns particulate graft polymers of the abovementioned composition and also thermoplastic molding materials prepared using such graft polymers. There now follow details concerning the particulate graft polymers, their constituent components, their preparation and the production of corresponding molding materials.

The particulate graft polymers are obtained from a grafting base (rubber) A and a graft sheath B in a conventional manner. Rubber A is a crosslinked acrylic ester polymer having a glass transition temperature of below 0° C., preferably below −20° C., more especially below −30° C. (the glass transition temperature is determined for example by differential scanning calorimetry; K.H. Illers, Makromol. Chemie 127 (1969), 1). Suitable monomers A1 for preparing the rubber are alkyl acrylates having from 1 to 8 carbon atoms in the alkyl moiety, at least in part those having from 4 to 8 carbon atoms in the alkyl moiety. Particularly suitable alkyl acrylates are n-butyl acrylate and ethylhexyl acrylate. The acrylic esters can be used each on their own or else mixed with one another.

To obtain good mechanical properties, it has been found to be necessary for the acrylic ester polymer grafting base to be crosslinked. To this end, the polymerization of the acrylic ester is carried out in the presence of from 0.1 to 5 % by weight, preferably from 1 to 4 % by weight, based on the total weight of the monomers used in the preparation of the grafting base, of a copolymerizable, polyfunctional, crosslinking monomer A2. Suitable monomers for this purpose are those which contain at least two double bonds capable of copolymerization which are not conjugated in the 1,3-position. Examples are divinylbenzene, diallyl maleate, diallyl fumarate, diallyl phthalate, allyl methacrylate, triallyl cyanurate and triallyl isocyanurate. A particularly favorable crosslinking monomer is the acrylic ester of tricyclodecenyl alcohol (cf. DE 12 60 135).

To improve the degree of attachment of the graft sheath to the grafting base, the present invention, provides that the monomer mixture used for preparing the grafting base additionally contains from 0.1 to 10 % by weight, preferably from 1 to 5 % by weight, of one or more hydroxyalkyl acrylates or methacrylates A3. Suitable hydroxyalkyl acrylates and methacrylates are esters of acrylic acid or methacrylic acid with polyhydric alcohols, but the preparation of these compounds is not restricted to direct esterification. Particularly preferred hydroxyalkyl acrylates contain from 2 to 6 carbon atoms in the alkyl moiety, e.g. 2-hydroxyethyl acrylate, 2-hydroxyethyl methacrylate and 4-hydroxybutyl acrylate.

The graft copolymer can be prepared by the method described in DE 12 60 135. It involves preparing first the grafting base A by polymerizing the acrylic ester(s) A1, the polyfunctional monomer A2 and the invention-defining hydroxyalkyl (meth)acrylate A3 in an aqueous emulsion at from 20 to 100° C., preferably at from 50 to 80°0 C. It is possible to use the customary emulsifiers such as the alkali metal salts of alkyl- or alkylarylsulfonic acids, alkyl sulfates, fatty alcohol sulfonates, salts of higher fatty acids of from 10 to 30 carbon atoms or resin soaps. Preference is given to using sodium salts of alkylsulfonates -or of fatty acids of from 10 to 18 carbon atoms. It is advantageous to use the emulsifiers in amounts of from 0.5 to 5 % by weight, in particular from 1 to 2 % by weight, based on the total weight of the monomers used for preparing the grafting base A. In general, a water/monomer ratio of from 2 : 1 to 0.7 : 1 is employed. The polymerization initiators employed are in particular the customary persulfates, e.g. potassium peroxodisulfate, but it is also possible to use redox systems. The amount of initiator (for example from 0.1 to 1 % by weight, based on the total weight of the monomers) depends on the desired molecular weight in a conventional manner.

Suitable polymerization aids are the customary buffer substances for setting a pH of from preferably 6 to 9, e.g. sodium bicarbonate and sodium pyrophosphate, and also up to 3 % by weight of a molecular weight regulator, such as mercaptans, terpinols or dimeric α-methylstyrene.

The exact polymerization conditions, in particular the nature, rate of addition and amount of emulsifier, are determined in detail within the abovementioned ranges in such a way that the resulting latex of the crosslinked acrylic ester polymer has a $d_{50}$ value within the range from about 30 to 1000 ran, preferably within the range from 50 to 800 nm.

It is also possible in principle to prepare the grafting base by a method other than emulsion polymerization, for example by bulk or solution polymerization, and to emulsify the resulting polymers subsequently. Methods for this purpose are known. Graft sheath B:

The graft copolymer with its core and sheath structure is prepared by adding to the latex A obtained a monomer mixture of at least one aromatic vinyl monomer B1 and at least one copolymerizable polar monomer B2 in a ratio of from 90 : 10 to 60 : 40, preferably from 80 : 20 to 65 : 35, and polymerizing. Examples of aromatic vinyl monomers are styrene, a-methylstyrene and ring-alkylated styrenes such as p-methylstyrene and tertbutylstyrene. Particular preference is given to using styrene, a-methylstyrene and p-methylstyrene. Examples of polar, copolymerizable, ethylenically unsaturated monomers B2 are acrylonitrile, alkyl methacrylates having from 1 to 4 carbon atoms in the alkyl moiety, acrylic acid, maleic anhydride, acrylamide and/or vinyl methyl ether. Preference is given to acrylonitrile, methyl methacrylate and mixtures thereof. Particularly preferred monomer mixtures contain from 45 to 80 % by weight of styrene or a-methylstyrene and from 10 to 30 % by weight of acrylonitrile.

The graft copolymerization onto the grafting base polymer is advantageously also carried out in aqueous emulsion. It may in fact be carried out in the same system as the polymerization of the grafting base, in which case further emulsifier and initiator may be added. They need not be identical to the emulsifiers or initiators used for preparing the grafting base A. For instance, it can be advantageous to use a persulfate initiator for preparing the grafting base A but a redox initiator system for polymerizing the graft sheath B. In other respects, the choice of emulsifier, initiator and polymerization assistants is subject to the remarks made in connection with the preparation of grafting base A. The graft monomer mixture may be added to the reaction mixture all at once, a little at a time in multiple stages or preferably continuously during the polymerization. The graft copolymerization is carried out in such a way as to produce a degree of grafting of from 10 to 45 % by weight, preferably from 15 to 40 % by weight.

The particulate graft polymers according to the present invention can be used alone as molding materials. To this end they can be worked up for example by spray drying. Preferably, however, the particulate graft polymers are used for blending with a thermoplastic to increase the impact toughness of the latter. Thermoplastics which are suitable for modification have a glass transition temperature of above 25° C., preferably above 60° C., more especially above 80° C. They are also referred to as the hard component (matrix) in what follows. Examples of suitable hard components are polyvinyl chloride, polymethyl methacrylate and in particular copolymers of an aromatic vinyl monomer and a polar, copolymerizable, ethylenically unsaturated monomer. Suitable aromatic vinyl and also polar, copolymerizable ethylenically unsaturated monomers again are those mentioned as B1 and B2 in connection with the preparation of the graft sheath. Particularly preferred hard components are styrene/acrylonitrile and α-methylstyrene/acrylonitrile copolymers. The particulate graft polymers according to the present invention can be incorporated for example by isolating the particulate graft polymer from the emulsion by addition of an electrolyte and then mixing it with the hard component, with or without drying, by conjoint extruding, kneading or rolling.

The thermoplastic molding materials according to the present invention may also contain additives of the type customary for thermoplastic molding materials. Examples thereof are fillers, further, compatible plastics, antistats, antioxidants, flame retardants, lubricants, dyes and pigments. The additives are used in customary amounts, preferably in amounts of from 0.1 to 30 % by weight, based on the total weight of the thermoplastic molding material. Compatible plastics may also account for a higher proportion.

The materials according to the present invention can be processed by methods customary for thermoplastics, for example extrusion or injection molding, into shaped articles such as window profiles, garden furniture, boats, signs, lamp covers, automative parts and children's toys. The materials according to the present invention are especially suitable for producing shaped articles where a combination of high impact toughness with a high weathering and aging resistance is required.

The characterizing parameters used hereinafter were determined as follows:

1. The reported median particle size is in all cases the weight-based median particle size as determined by means of an analytical ultracentrifuge using the method of W. Scholtan and H. Lange, Kolloid-Z. and Z.-Polymere 250 (1972), 782–96. The ultracentrifuge measurement gives the cumulative weight distribution of the particle diameter of a sample. It reveals what weight percentage of the particles has a diameter equal to or less than a certain size. The median particle diameter, which is also referred to as the d.50 value of the cumulative weight distribution, is defined as that value which is less than the diameter of 50 % by weight of the particles and greater than the diameter of 50 % by weight of the particles.

2. The notched impact strength in [kj/m$^2$] was measured in accordance with German Standard Specification DIN 53 453 on injection molded standard test bars at 23° C. Three samples were tested of each Example. The results found for the Examples are summarized in the table.

3. The viscosity numbers in (CM$^3$/g] were determined on a 0.5 % strength solution in methyl ethyl ketone. Insoluble gel fractions were removed prior to the measurement, by centrifuging, and the sample weight was correspondingly corrected.

EXAMPLES

1. Preparation of the grafting base

Each grafting base was prepared using the following general method: 160 g of the monomer mixture specified in the table were heated to 60° C. with stirring in 1500 g of water in the presence of 5 g of the sodium salt of C$_{12}$-C$_{18}$-paraffinsulfonic acid, 3 g of potassium peroxodisulfate, 3 g of sodium bicarbonate and 1.5 g of sodium pyrophosphate. 10 minutes after the polymerization reaction had started, a further 840 g of the monomer mixture were added in the course of 3 hours. On completion of the monomer addition, the emulsion was maintained at 60° C. for a further hour.

2. Preparation of particulate graft polymers 2100 g of the emulsion prepared by method (1) were mixed with 1150 g of water and 2.7 g of potassium peroxodisulfate and the mixture was heated to 65° C. with stirring. After the reaction temperature had been reached, a mixture of 420 g of styrene and 140 g of acrylonitrile was added in the course of 3 hours. On completion of the addition, the emulsion was maintained at 65° C. for a further 2 hours. The graft polymer was precipitated from the emulsion with calcium chloride solution at 95° C., washed with water and dried in a stream of hot air.

3. Blending with hard component

The hard component used was a styrene/acrylonitrile copolymer having an acrylonitrile content of 35 % and a viscosity number of 80 ml/g. The precipitated and dried graft copolymer of (2) was extruder blended at 260° C. with the hard component in such a way that the resulting mixture had a graft polymer content of 50 %. This mixture was used for producing injection moldings.

TABLE

| | Grafting base A[1] | | | | | d$_{50}$ value [nm] | Injection molding temperature[2] | Notched impact strength [kJ/m$^2$] |
| --- | --- | --- | --- | --- | --- | --- | --- | --- |
| | BA | DCPA | HEA | HPA | HBA | | | |
| 1 | 97 | 2 | 1 | — | — | 101 | 220° C. | 22 |
| | | | | | | | 250° C. | 24 |
| | | | | | | | 280° C. | 22 |
| 2 | 96 | 2 | 2 | — | — | 106 | 220° C. | 24 |
| | | | | | | | 250° C. | 24 |
| | | | | | | | 280° C. | 22 |
| 3 | 95 | 2 | 3 | — | — | 103 | 220° C. | 25 |
| | | | | | | | 250° C. | 24 |
| | | | | | | | 280° C. | 22 |
| 4 | 96 | 2 | — | 2 | — | — | 220° C. | 18 |
| | | | | | | | 250° C. | 25 |
| | | | | | | | 280° C. | 25 |
| 5 | 96 | 2 | — | — | 2 | — | 220° C. | 25 |
| | | | | | | | 250° C. | 24 |
| | | | | | | | 280° C. | 20 |
| Comparison | 98 | 2 | — | — | — | 102 | 220° C. | 6 |
| | | | | | | | 250° C. | 9 |
| | | | | | | | 280° C. | 14 |

[1]Composition of the monomer mixture used for preparing the grafting base A (% by wight)
[2]Melt temperature of thermoplastic molding material in injection molding
BA = butyl acrylate
DCPA = acrylic ester of tricyclodecenyl alcohol
HEA = 2-hydroxyethyl acrylate
HPA = 2-hydroxypropyl acrylate
HBA = 4-hydroxybutyl acrylate

We claim:

1. A thermoplastic molding material consisting essentially of 1–40% by weight of a particulate graft polymer comprising
    A: from 30 to 90% by weight of at least one elastomeric polymer A having a T$_g$<0° C. and having a median particle size of from 30 to 100 nm comprising—based on A—
        A1: from 85 to 99.8% by weight of at least one alkyl acrylate A1 having from 1 to 8 carbon atoms in the alkyl moiety,
        A2: from 0.1 to 5% by weight of at least one polyfunctional, crosslinking monomer A2 having at least two double bonds capable of copolymerization which are not conjugated in the 1,3-position and A3: from 0.1 to 10% by weight of a hydroxyalkyl acrylate or methacrylate, as grafting base, and B: from 10 to 70% by weight, grafted onto the elastomeric polymer A, of a sheath B consisting essentially of —based on B—
- B1: from 50 to 90% by weight of at least one aromatic vinyl monomer B1 and
- B2: from 10 to 50% by weight of at least one polar, copolymerizable, ethylenically unsaturated monomer B2 selected from the group consisting of acrylonitrile and methyl methacrylate; as obtained by graft copolymerizing in aqueous emulsion the elastomeric polymer A and the monomers B1 and B2, and 50 to 99% by weight of at least one matrix polymer selected from the group consisting of styrene acrylonitrile and α-methylstyrene acrylonitrile copolymers having a glass transition temperature of more than 25° C. and optionally minor amounts of customary additives and assistants.

2. A thermoplastic molding material as claimed in claim 1, wherein the matrix is a styrene acrylonitrile copolymer having a glass transition temperature of more than 25° C.

3. A thermoplastic molding material as claimed in claim 1, wherein the matrix is a α-methylstyrene acrylonitrile copolymer having a glass transition of more than 25° C.

4. A thermoplastic molding material as claimed in claim 1, wherein the matrix is a mixture of a styrene acrylonitrile copolymer and an α-methylstyrene acrylonitrile copolymer, both of which have a glass transition temperature of more than 25° C.

* * * * *